March 31, 1964    H. L. TERWILLIGER    3,126,678
GRINDING MACHINE
Filed Oct 16, 1961    2 Sheets-Sheet 1

INVENTOR.
HENRY L. TERWILLIGER.
BY
*Barthel & Bigbee*
ATTORNEYS

March 31, 1964

H. L. TERWILLIGER 3,126,678

GRINDING MACHINE

Filed Oct 16, 1961

INVENTOR.
HENRY L. TERWILLIGER
BY
Barthel & Bigbee
ATTORNEYS

United States Patent Office 3,126,678
Patented Mar. 31, 1964

3,126,678
GRINDING MACHINE
Henry L. Terwilliger, Southfield, Mich., assignor to Gorham Tool Company, Detroit, Mich., a corporation of Michigan
Filed Oct. 16, 1961, Ser. No. 145,389
5 Claims. (Cl. 51—218)

This invention relates to grinding machines and, in particular, to tool grinding machines.

One object of this invention is to provide a machine for producing both curved and flat tapering surfaces upon workpieces, such as the tips of cutting tools, blades and single point tools, in a rapid and convenient manner.

Another object is to provide a machine of the foregoing character wherein the workpiece, such as a cutting tool, is machined with a curved surface diverging in the direction of its own axis.

Another object is to provide a machine of the foregoing character having means therein for selectively positioning a workpiece, such as a cutting tool, for rotation about one axis in order to establish the angularity of the curved surface produced on the workpiece with respect to its own center line, means being provided for rotating the workpiece about a second axis corresponding to the center line of the curved portion on the workpiece and disposed at right angles to the first axis but offset relatively thereto in order to determine the configuration of the curved surface produced on the workpiece.

Another object is to provide a machine of the foregoing character containing mechanism for readily adjusting the distance of the second axis relatively to the first axis.

Another object is to provide a machine of the foregoing character wherein mechanism is also provided for quickly and accurately presetting the workpiece and grinding wheel or other machining element relatively to one another to predetermine the radius of the curved portion machined on the workpiece, such as the cutting tool, thereby eliminating the need for cut-and-try procedure in setting up the workpiece for such grinding or other machining.

Another object is to provide a machine of the foregoing character including mechanism for producing curved and straight side clearance surfaces disposed at varying angles relatively to the top surface of the workpiece, such as the top cutting surface of a cutting tool.

Another object is to provide a machine of the foregoing character including means for holding a workpiece such as a cutting tool, permitting rotation of the workpiece around a substantially horizontal axis and a substantially vertical axis, with these two axes disposed in a non-intersecting relationship except in the original zero-setting position of the machine whereby the linear movement of the vertical axis with respect to the horizontal axis equals the radius of curvature of the curved surface to be produced on the workpiece, such as a cutting tool, regardless of the angular setting of the vertical axis.

Another object is to provide a machine of the foregoing character which is well adapted for renewing the cutting edges upon the sintered carbide tips of cutting tools containing inserts of that material, such as tungsten carbide.

Other objects and advantages of the invention will become apparent during the course of the following description of the accompanying drawings, wherein.

Figures 1, 2:
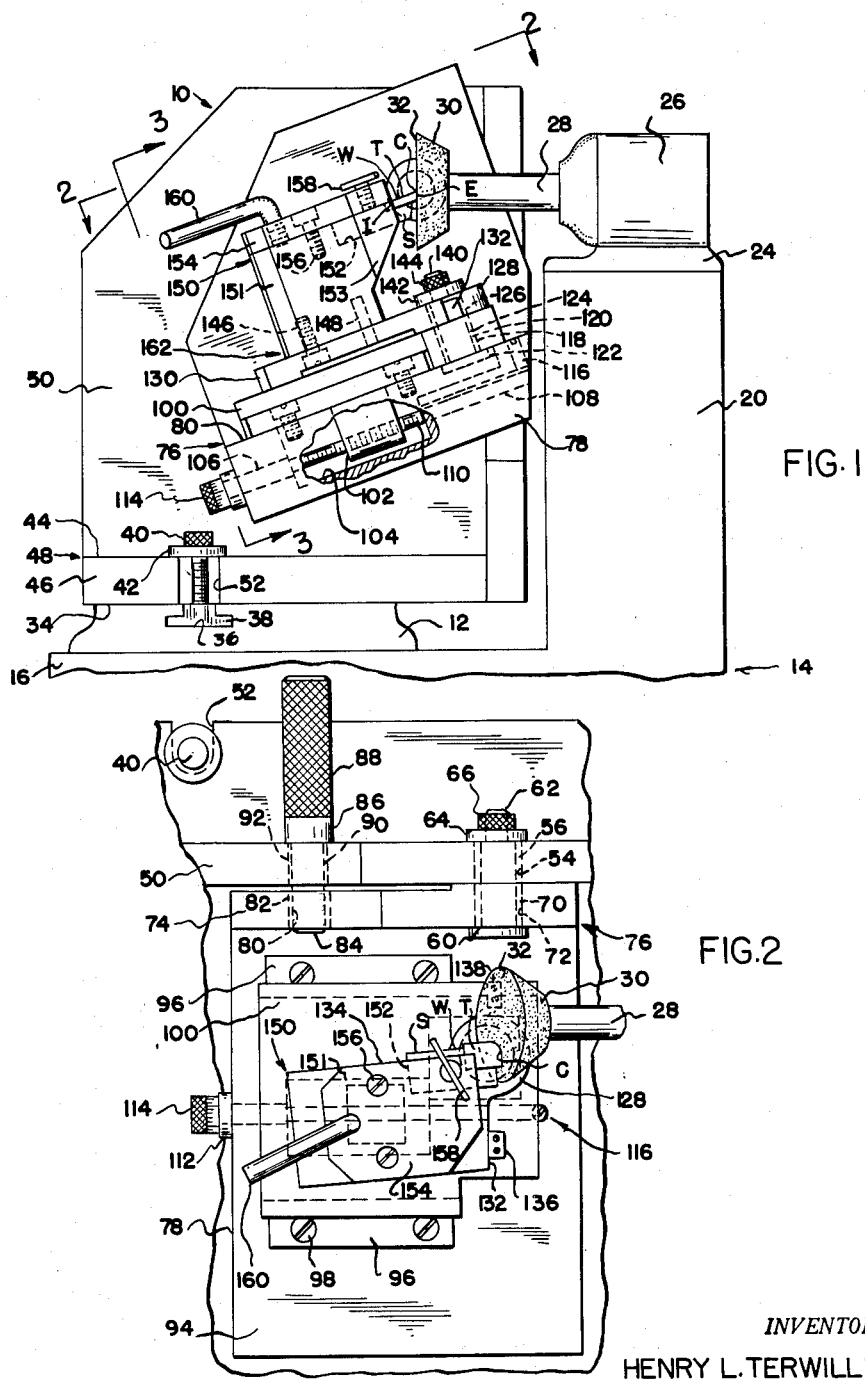
FIGURE 1 is a side elevation of a tool grinding machine according to one form of the invention, showing a cutting tool mounted in a tilted position relatively to the face of the grinding wheel for producing a curved surface thereon, the center line or axis of which is perpendicular to the top surface of the cutting tool or other workpiece.
FIGURE 2 is a fragmentary top plan view of the major portion of the machine shown in FIGURE 1, looking in the direction of the line 2—2 in FIGURE 1.

Referring to the drawings in detail, FIGURE 1 shows a cutting tool grinding machine, generally designated 10, according to one form of the invention as adapted to be bolted or otherwise secured to the longitudinally-slidably-adjustable table 12 of a conventional grinding machine, generally designated 14, having a bed 16 with an upstanding pedestal 20. Mounted on the top 22 of the pedestal 20 is the base 24 of a motor 26, such as an electric motor, having a rotary armature shaft 28 upon the outer end of which is secured a grinding wheel 30 preferably of frusto-conical shape with a forward grinding face 32 disposed perpendicular to the axis of rotation of the rotor shaft 28.

The grinding machine table 12 is provided with a machined precisely flat top surface 34 and one or more longitudinal T-slots 36 which receive correspondingly shaped heads of threaded T-bolts or hold-down bolts 38. Threaded onto the upper ends of the T-bolts 38 are nuts 40 equipped with washers 42 engaging the upper surface 44 of the base plate portion 46 of a stationary angle plate, generally designated 48, of inverted T-shaped form having a vertical plate or upright support 50 disposed at right angles to the base plate portion 46. The hold-down bolts 38 pass through notches 52 (FIGURES 1 and 4) formed in the opposite ends of the base plate portion 46 to hold the angle plate 48 in a stationary position relatively to the grinding machine table 12.

The vertical plate portion or upright support 50 is bored horizontally at 54 (FIGURE 2) to receive a bearing bushing 56 which may, for convenience, be formed of hardened steel for wear-resisting purposes. Mounted in the bearing bushing 56 is a headed primary pivot shaft 60, the reduced diameter threaded end portion 62 of which passes through a washer 64 and carries a retaining nut 66 (FIGURE 2). The primary pivot shaft 60 passes through a bearing bushing 70 mounted in a bore 72 in the vertical plate portion 74 of a swinging angle plate or angle structure 76 having a horizontal plate portion 78 rigidly connected to the vertical plate portion 74 and offset radially from the primary pivot axis of the primary pivot shaft 60. In order to provide for holding the swinging angle plate 76 in various positions of tilt around the primary pivot axis of the primary pivot shaft 60 relatively to the stationary angle plate 48, the vertical plate portion 74 of the movable angle plate 76 is provided with a multiplicity of horizontal bores or holes 80 (FIGURES 2 and 4) containing bushings 82 snugly engaged by the smooth reduced-diameter inner end portion 84 of a stop pin or plug 86 having an enlarged handle portion 88 at its outer end. The end portion 84 also passes through and snugly engages a bushing 90 mounted in a horizontal hole or bore 92 in the upright support 50. The bushings 56, 70, 82 and 90 are preferably of hardened steel or other wear-resisting material, precisely bored and ground. Consequently, by withdrawing the smooth end portion 84 from one bushing 82 and then tilting the movable angle plate 76 into a different desired position of tilt in which another of the bushings 82 comes into alignment with the bushing 90, the operator can reinsert the end portion 84 therein and lock the movable angle plate 76 in its readjusted position at a new angle of tilt relatively to the face 32 of the grinding wheel 30.

Figure 3:
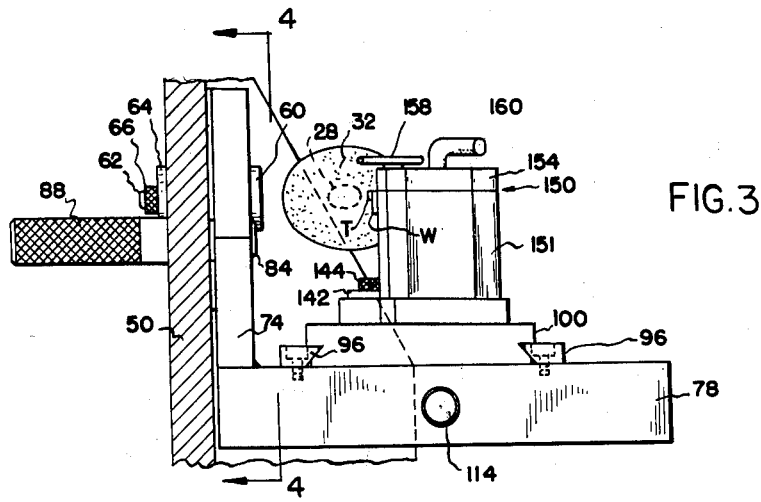
FIGURE 3 is a fragmentary rear elevation in a slightly inclined plane, partly in section along the line 3—3 in FIGURE 1.

Mounted on the machined upper surface 94 of the horizontal plate portion 78 and offset radially from the primary pivot axis of the primary pivot shaft 60 in spaced parallel relationship to one another are two elongated beveled guide members or gibs 96 bolted or otherwise secured thereto as at 98 (FIGURES 2 and 3). It will be apparent from the geometry of FIGURES 1 and 3 that the guide members 96 define a rectilinear guideway spaced radially away from the primary pivot axis of the primary pivot shaft 60 and disposed substantially tangential to a circular arc of swing lying in a plane perpendicular to said primary pivot axis with its center on said primary pivot axis. Slidably mounted in the gibs 96 is a dovetail slide plate or workpiece holder carrier 100 having an internally-threaded block or nut 102 (FIGURE 1) secured to and extending downwardly from the bottom thereof into an elongated recess 104 in the base plate portion 78 of the movable angle plate 76. Rotatably mounted in aligned bearing bores 106 and 108 in the base plate portion 78 is a screw shaft 110 threadedly engaging the nut 102. The screw shaft 110 passes through an index collar 112 secured to the base plate portion 78 and carrying a fixed index or zero position pointer or mark. Mounted on the outer end of the screw shaft 110 is a graduated or calibrated knob 114, the graduations of which are in registry with the fixed zero index mark on the fixed index collar 112. The inner end of the screw shaft 110 is grooved to receive the inner end of a retaining set screw 116 threaded downwardly through the base plate portion 78 at right angles to the axis of the screw shaft 110 so as to permit rotation thereof while preventing end motion.

Near its forward end, the slide plate 100 is provided with a bore 118 (FIGURE 1) disposed with its axis perpendicular to the guideway defined by the guide members 96 and hence perpendicular to the axis of reciprocation of the slide plate 100 and containing a bearing bushing 120 which receives a headed secondary pivot shaft or rod 122. The upper portion of the secondary pivot shaft 122 passes through a corresponding bearing bushing 124 carried by a bore 126 in the offset forward end portion 128 of a laterally-swinging base plate 130 having forward and side stop edges 132 and 134 respectively (FIGURE 2) engageable with stop blocks 136 and 138 respectively bolted or otherwise secured to the slide plate 100 at approximately diametrically opposite points relatively to the axis of the secondary pivot shaft 122. The reduced diameter upper end portion 140 of the secondary pivot shaft 122 passes through a washer 142 engaging the upper surface of the swinging base plate 130 and carries a retaining nut 144 (FIGURE 1).

Secured as by bolts 146 and dowel pins 148 to the swinging base plate 130 is a workpiece holder 150 including an upstanding block 151 of steel or other suitable material having a corner recess 152 in its overhanging forward end portion 153. The workpiece holder 150 also includes a top plate 154 bolted to the top of the block 151 as by the screws 156. The top plate 154 extends over and closes the top of the corner recess 152. The top plate 154 is bored and threaded over the recess 151 to receive a wing bolt or workpiece clamping screw 158 which removably secures in the recess 151 the shank S of a workpiece W having a tip insert I, the cutting edge C of the forward end E of which is to be machined. The tip insert I of the workpiece W is conveniently the tungsten carbide insert of a cutting tool. In such carbide-tipped cutting tools, the insert I is frequently mounted in the corner of the shank S and the cutting edge C constitutes the rounded corner of the tip insert I (FIGURE 2), while the end E is ground with a conical surface which in effect undercuts the insert top T terminating in the cutting edge C. An L-shaped handle 160 is threaded into or otherwise secured to the top plate 156 for laterally swinging the workpiece holding structure, generally designated 162, including the swinging plate 130 and workpiece holder 150.

In the operation of the machine 10, let it be assumed that the machine 10 has been properly mounted on the table 12 of the grinding machine 14 and secured thereto as by the holddown bolts 38 passing through the notches 52 in the base plate portion 46 of the stationary angle plate 48. Let it also be assumed that the front or grinding face 32 of the grinding wheel 30 has been accurately positioned in alignment with the axis of the horizontal pivot shaft 60. The axis of the secondary pivot shaft 122, however, is normally upwardly-inclined and does not come into alignment with the axis of the primary pivot shaft 60 except in the zero position of the slide plate 130 of the workpiece holding structure 162 when the calibrated knob 114 is in its zero position. It will be understood, however, that this coincidental position of the various components of the machine 10 is ordinarily assumed only in the initial line-up or alignment of these components and is rarely if ever assumed during operation, because a tilted and offset relationship of the workpiece support 76 relatively to the grinding wheel face 32, as explained below, is usually required in properly configuring the conically-curved end E and arcuate cutting edge C of the insert tip I of the cutting tool or other workpiece W in the oblique position of the end E relatively to the top surface T.

Figure 4:
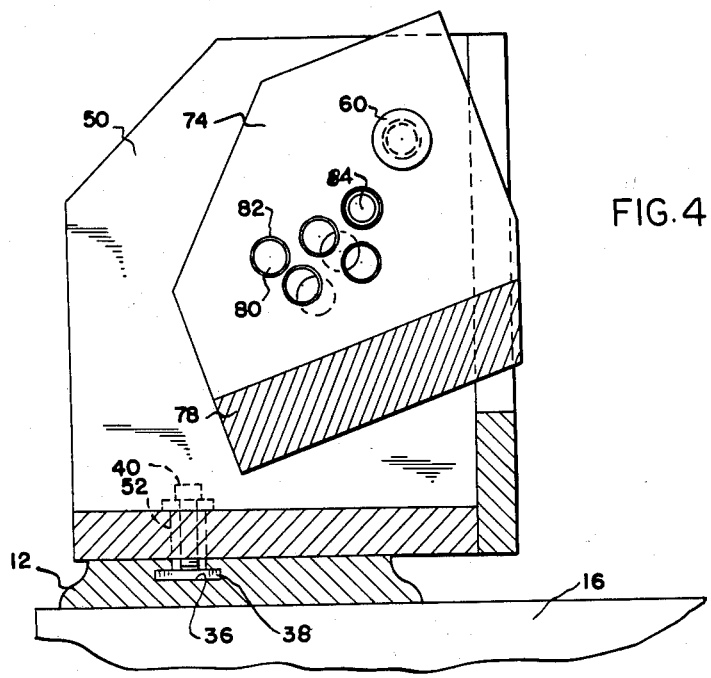
FIGURE 4 is a vertical cross-section taken along the line 4—4 in FIGURE 3, but including the major part of the machine shown in FIGURE 1.

To produce this desired configuration on the end E of the cutting tool tip T, the operator first mounts the shank S of the cutting tool or other workpiece W in the recess 151 and clamps it in position by the clamping screw 158. Having withdrawn the stop pin or plug 86, he then tilts the tiltable angle plate 76 to the desired angle which the end E of the tip insert I is to occupy relatively to the top surface T thereof, and reinserts the stop pin or plug 86 in the bushing 82 of the horizontal bore or hole 80 nearest that tilted position (FIGURE 4). The position of the cutting edge C of the tip insert I transversely relatively to the face 32 of the grinding wheel 30 is then adjusted by moving the grinding wheel table 12 relatively to the bed 16 thereof by the lead screw mechanism, hydraulic cylinder or other conventional means ordinarily provided in such grinding machines 14.

During this procedure, the operator also grasps the knob 114 in the fingers of one hand and rotates the screw shaft 110 in order to move the workpiece holding structure 162 bodily in its guideways 96 relatively to the tiltable angle plate 76. By such action he backs off the cutting edge C and end E of the tip insert I of the cutting tool or other workpiece W the desired distance in order to produce the desired radius of curvature thereon and also to produce the desired angular relationship of the end E relatively to the top surface T of the cutting tool tip insert I. In this set-up position, the axis of the now upwardly-inclined secondary pivot shaft 122 is spaced away from the horizontal axis of the horizontal primary pivot shaft 60 so as to determine the radius of curvature of the surface which will be ground upon the workpiece insert end E.

Having performed these preliminary set-up operations, the operator starts the motor 26 in operation, rotating the motor shaft 28 and grinding wheel 30, at the same time grasping the handle 160 and swinging the workpiece holding structure 162 laterally in its inclined position around the inclined axis of the upwardly-inclined secondary pivot shaft 122. This action causes the end E of the cutting tool tip insert I to swing across the grinding face 32 of the grinding wheel 30 around the axis of the inclined secondary pivot shaft 122, forming a conical surface upon the end E and imparting a sharp arcuate cutting edge of the desired radius upon the cutting edge C, which is of course the intersection of the end E with the top T of the insert I.

In the machine constructed according to the foregoing disclosure, the axis of the curved surface ground on the cutting tool end E is substantially perpendicular to the top or cutting surface T of the cutting tool or other workpiece W, thus making a curved end surface E a substantially conical surface. It will be understood, however, that making the axis of the conical surface E perpendicular to the top surface T of the workpiece W is a convenient arrangement and that it is contemplated that in some constructions of the machine of the present invention, the axis of the end surface E may be tilted relatively to the top or cutting surface T of the tool or other workpiece W.

What I claim is:

1. A machine for grinding an arcuate top edge and an inclined curved end surface upon a workpiece, said machine including a stationary structure having an upright portion containing substantially horizontal primary pivot means having a substantially horizontal primary pivot axis, a tiltable structure pivotally mounted on said primary pivot means for tilting adjustment around said substantially horizontal primary pivot axis relatively to said stationary structure, means for locking said tiltable structure in its tilted position of adjustment relatively to said stationary structure, a rectilinear guideway on said tiltable structure spaced radially away from said primary pivot axis and disposed substantially tangential to a circular arc of swing lying in a plane perpendicular to said primary pivot axis with its center on said primary pivot axis, a workpiece holder carrier mounted on said guideway for adjustment motion therealong toward and away from said primary pivot axis of said primary pivot means, secondary pivot means on said carrier having a secondary pivot axis disposed transverse to said primary pivot axis, a workpiece holder pivotally mounted on said secondary pivot means for swinging motion around said secondary pivot axis, and means for removably securing a workpiece to said workpiece holder.

2. A grinding machine, according to claim 1, wherein a rotary screw shaft is rotatably mounted on said tiltable structure with its axis of rotation disposed transverse to said primary pivot axis and wherein said carrier has a threaded portion threadedly engaging said screw shaft for propulsion thereby toward and away from said primary pivot axis in response to rotation of said screw shaft.

3. A grinding machine, according to claim 1, wherein said tiltable structure includes an angle plate having a substantially vertical portion pivotally mounted on said horizontal pivot means in said upright portion, and wherein said locking means is mounted on one of said portions and extends into releasable locking engagement with the other of said portions.

4. A grinding machine, according to claim 1, wherein said tiltable structure includes an angle member having a substantially vertical portion pivotally engaging said primary pivot means for swinging motion around said primary pivot axis and a substantially horizontal portion disposed approximately perpendicular to said vertical portion and having said guideway mounted thereon in substantially parallel relationship with said vertical portion.

5. A machine for grinding an arcuate top edge and an inclined curved end surface upon a workpiece, said machine including a stationary structure having an upright portion containing substantially horizontal primary pivot means having a substantially horizontal primary pivot axis, a tiltable structure pivotally mounted on said primary pivot means for tilting adjustment around said substantially horizontal primary pivot axis relatively to said stationary structure, means for locking said tiltable structure in its tilted position of adjustment relatively to said stationary structure, a workpiece holder carrier mounted on said tiltable structure at a location spaced radially away from said primary pivot axis and disposed substantially tangential to a circular arc of swing lying in a plane perpendicular to said primary pivot axis with its center on said primary pivot axis, secondary pivot means on said carrier having a secondary pivot axis disposed transverse to said primary pivot axis, a workpiece holder pivotally mounted on said secondary pivot means for swinging motion around said secondary pivot axis, and means for removably securing a workpiece to said workpiece holder.

References Cited in the file of this patent

UNITED STATES PATENTS

| 361,851 | Whitcomb | Apr. 26, 1887 |
| 1,931,730 | Klay | Oct. 24, 1933 |
| 2,381,034 | Bura | Aug. 7, 1945 |
| 2,417,729 | Bazley | Mar. 18, 1947 |
| 2,425,095 | Henkel | Aug. 5, 1947 |
| 2,480,618 | Tresidder | Aug. 30, 1949 |
| 3,020,681 | Hite | Feb. 13, 1962 |

FOREIGN PATENTS

| 251,708 | Switzerland | Aug. 16, 1948 |